United States Patent
Carlson et al.

(10) Patent No.: US 6,303,731 B1
(45) Date of Patent: Oct. 16, 2001

(54) MOISTURE CURABLE POLYURETHANE COMPOSITIONS

(75) Inventors: Brian W. Carlson, Woodbury; Brian H. Glasbrenner, Brooklyn Park; Eugene R. Simmons, Vadnais Heights, all of MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/488,261

(22) Filed: Jan. 20, 2000

Related U.S. Application Data
(60) Provisional application No. 60/116,503, filed on Jan. 20, 1999.

(51) Int. Cl.[7] .................................................. C08G 18/10
(52) U.S. Cl. ............................ 528/59; 525/127; 525/130; 428/423.1
(58) Field of Search ............................. 528/59; 525/127, 525/130; 428/423.1

(56) References Cited

U.S. PATENT DOCUMENTS

| | | | |
|---|---|---|---|
| 4,661,542 | 4/1987 | Gilch et al. | 524/59 |
| 4,775,719 | 10/1988 | Markevka et al. | 525/125 |
| 4,808,255 | 2/1989 | Markevka et al. | 525/440 |
| 4,914,173 | 4/1990 | Ansell | 528/49 |
| 5,099,832 | 3/1992 | Ward | 602/57 |
| 5,183,664 | 2/1993 | Ansell | 424/445 |
| 5,326,627 | * 7/1994 | Yazaki et al. | 428/216 |
| 5,441,808 | 8/1995 | Anderson et al. | 428/349 |
| 5,714,543 | 2/1998 | Shah et al. | 525/123 |
| 5,755,681 | 5/1998 | Plews | 602/58 |
| 5,939,499 | 8/1999 | Anderson et al. | 525/440 |

FOREIGN PATENT DOCUMENTS

| | | |
|---|---|---|
| 199 08 562 A1 | 10/1999 | (DE) . |
| 425694 A1 | 11/1990 | (EP) . |
| 573206 A1 | 5/1993 | (EP) . |
| 759450 A2 | 8/1996 | (EP) . |
| WO 96/26966 | 9/1996 | (WO) . |
| WO 97/43328 | 11/1997 | (WO) . |
| wO 99/38900 | 8/1999 | (WO) . |

OTHER PUBLICATIONS

S.D. Seneker & N. Barksby; A New Generation of Polyether Polyols for the Urethane Industry; Utech; 1996 –Dec., pp. 1–10.*

* cited by examiner

*Primary Examiner*—Rachel Gorr
(74) *Attorney, Agent, or Firm*—Nancy Quan

(57) ABSTRACT

A moisture curable composition that includes a polyurethane prepolymer comprising the reaction product of a) a polyol having an unsaturation of less than 0.02 meq/g; and b) a polyfunctional isocyanate, where the composition forms a pressure sensitive adhesive when cured, is disclosed.

21 Claims, No Drawings

MOISTURE CURABLE POLYURETHANE COMPOSITIONS

CROSS-REFERENCE TO RELATED APPLICATION

This application is a continuation-in-part of U.S. Provisional Application Serial No. 60/116,503, filed Jan. 20, 1999.

BACKGROUND OF THE INVENTION

The invention relates to moisture curable compositions.

Pressure sensitive adhesives are useful for a variety of purposes and in various applications. These adhesives may be applied to a first substrate, and may then be utilized to form a bond to a secondary substrate or surface at a later date with the application of light pressure. Pressure sensitivity requires a certain balance of elastic and viscous properties. The glass transition temperature and modulus (G') at application temperature have been found to be important properties for pressure sensitive adhesive performance as stated in the Handbook of Pressure Sensitive Adhesive Technology, Satas, Second Edition, 1989, p. 172. Pressure sensitive adhesive often have a room temperature storage modulus of no more than about $2 \times 10^6$ dynes/cm$^2$ at 75° C. and a Tg of about $-30°$ C. to about 10° C. depending on whether the composition is a permanent grade, removable grade or freezer grade adhesive. Typically pressure sensitive tape adhesives have high storage moduli. Pressure sensitive adhesives may also be defined by the method of bonding in which light pressure can cause a bond to form.

Widely used pressure sensitive adhesives are hot melt pressure sensitive adhesives, which are commonly based on block copolymers. These adhesives are a 100% solid system and are applied to a substrate in the molten state and then cooled to ambient temperatures. They are often used for labels, including both removable, semi-permanent and permanent labels, as well as for removable articles such as feminine napkins, diaper tapes and so forth.

Water-based pressure sensitive adhesives are also commonly utilized, and are typically based on latex or styrene-butadiene emulsions. Both water-based and hot melt PSA's may be based on acrylate copolymers as well.

Solvent based pressure sensitive adhesives are also utilized and often include an acrylic-based polymer system. These types of adhesives are popular for use in medical applications, for instance, in transdermal drug delivery applications whereby the adhesive is used to adhere the article to the skin. The disadvantages to using solvent based adhesives are obvious and include the detrimental effects of solvent on health as well as flammability issues of using solvents in commercial plants.

A growing industry in which pressure sensitive adhesives are being utilized is in the medical field for applications such as medical tapes, wound dressings and bandages. In these applications, adhesives that are known in the art as "skin attachment adhesives" are used. These adhesives require low 180° peel values (i.e., removability), low storage moduli, low glass transition temperatures and high moisture vapor transmission rates. As mentioned above, acrylic-based polymer systems are still widely used. Polyurethane-based pressure sensitive adhesives, in contrast, are not widely used because of the difficulty in achieving the viscoelastic characteristics necessary for a good pressure sensitive adhesive. U.S. Pat. No. 5,714,543 to Shah et al. issued Feb. 3, 1998 discloses a pressure sensitive adhesive that includes a polyurethane polymer that includes the reaction of a polyisocyanate with a polyol, and a dissolved water soluble polymer free from moieties that will react with isocyanate groups. An excess of polyol (i.e., hydroxyl functionality) relative to isocyanate is utilized resulting in a composition that has no isocyanate termination and the curing mechanism does not include moisture. The NCO:OH mole weight ratio is from about 0.5:1.0 to about 0.99:1.0, so that these polyurethanes have excess hydroxyl functionality. The composition is designed to have improved water uptake. The water soluble polymer additives enhance the water uptake.

U.S. Pat. No. 5,183,664 describes a thin film wound dressing that includes a backing layer having over one surface thereof a continuous adhesive layer. The adhesive includes a gel adhesive that is not self-adherent and preferably includes hydrophilic gel containing polyurethane residues. These polyurethane gels are based on polyoxyalkylene diol mono alkyl ethers. Polyoxyethylene-polyoxypropylene mono butyl ether, which is terminated with a hydroxyl group and with a butyl group, is disclosed as the preferred polyoxyalkylene diol mono alkyl ether. The polyurethane is cured by radiation but may be cured with a molar excess of water or with a stoichiometric amount of a polyol or polyol mixture.

U.S. Pat. No. 4,661,542 issued Apr. 28, 1987 to Gilch et al. discloses pressure-sensitive adhesives that are curable by atmospheric moisture and that include a prepolymer component with isocyanate functionality between 2.0 and 3.0 together with one or more polyetherurethane prepolymers having NCO groups available for reaction with water for chain extension. The cured adhesive composition has a glass transition temperature below 20° C. The composition of Gilch et al. includes at least two polyurethane prepolymers, one of which has an isocyanate functionality between about 2.0 and 3.0 and one of which is a polyetherurethane prepolymer. The polyurethane prepolymer has an isocyanate functionality between about 2.0 and 3.0 may be a blend of polyetherurethane prepolymers of various functionalities. Gilch et al. disclose, "If desired, prepolymers of lower functionalities may be used in conjunction with low molecular weight polyisocyanates of functionality in excess of 2.0 in order to achieve a suitable NCO functionality of the prepolymer component" (see column 4, lines 54 to 64). "For example compositions according to the invention may be produced using branched chain polyethers having an average hydroxyl functionality in excess of 2.0, for example in the range of 2.4 to 2.8 or greater" (see column 5, lines 21 to 25).

SUMMARY

In one aspect, the invention features a moisture curable composition that includes a polyurethane prepolymer that includes the reaction product of a) a polyol having an unsaturation of less than 0.02 meq/g; and b) a polyfunctional isocyanate, and that forms a pressure sensitive adhesive composition when cured.

In one embodiment the polyol is a polyether polyol. In some embodiments the polyol has an unsaturation of less than 0.01 meq/g. In other embodiments the polyether polyol includes less than about 40 mole % ethylene oxide. In one embodiment, the polyether polyol includes less than about 20 mole % ethylene oxide.

In another embodiment the polyurethane prepolymer has an NCO:OH ratio from about 1.5 to about 4.0. In other embodiments, the polyurethane prepolymer has an NCO:OH ratio from about 2.0 to about 3.0.

In some embodiments the polyol has a molecular weight of greater than about 4,000 g/mole. In other embodiments, the polyol has a molecular weight of at least about 8,000 g/mole.

In another embodiment, the polyol is selected from the group consisting of mols having an —OH functionality from about 1.90 to 1.99, triols having a functionality from about 2.85 to about 2.99, and mixtures thereof.

In one embodiment, the composition further includes a tackifying resin, e.g., a hydrocarbon tackifying resin, e.g., an α-methyl styrene resin.

In another aspect, the invention features a moisture curable composition that includes a polyurethane prepolymer that includes the reaction product of a) a polyol having a molecular weight of at least about 6,000; and b) a polyfunctional isocyanate, where the composition forms a pressure sensitive adhesive when cured. In one embodiment the polyol has a molecular weight of at least about 8,000. In some embodiments the polyol has a molecular weight of at least about 12,000. In other embodiments the polyol has a molecular weight of from about 8,000 to about 20,000. In another embodiment the polyurethane prepolymer has an NCO:OH ratio from about 1.5 to about 4.0.

In other aspects, the invention features a moisture curable composition that consists essentially of a polyurethane prepolymer consisting of a polyurethane prepolymer that includes the reaction product of a) a polyol; and b) a polyfunctional isocyanate, the composition forming a pressure sensitive adhesive when cured. In one embodiment the polyol has an unsaturation of less than 0.02 meq/g.

In another aspect, the invention features an article that includes a substrate and an above-described moisture curable composition.

In one aspect, the invention features a pressure sensitive adhesive composition that includes the reaction product of moisture and a polyurethane prepolymer that includes the reaction product of i) a polyol having an unsaturation of less than 0.02 meq/g; and ii) a polyfunctional isocyanate. In another embodiment, the invention features a pressure sensitive adhesive composition that includes a polyurethane prepolymer that includes the above-described moisture curable composition.

In other aspects, the invention features a method of applying an above-described moisture curable composition to a substrate. The method includes: a) heating an above-described moisture curable composition, b) passing the heated composition through an aperture, c) contacting the heated composition with pressurized air, and d) contacting a substrate with the composition.

The polyurethane prepolymer cures by contact with moisture to a pressure sensitive adhesive and can include other reaction components, e.g., other polyols, and can be formulated with other components including, e.g., thermoplastic polymers, to provide pressure sensitive adhesive compositions having desired properties and that are suitable for desired uses. The polyurethane prepolymer is useful as a component in a variety of pressure sensitive adhesive compositions and in a variety of applications. Cured adhesive compositions formulated with the polyurethane prepolymer exhibit good pressure sensitivity, good moisture vapor transmission rate, good solvent resistance, and good heat resistance.

Additional features and advantages of the invention will be apparent from the description of the preferred embodiment thereof and from the claims.

DETAILED DESCRIPTION OF THE INVENTION

The moisture curable composition includes a polyurethane prepolymer that includes the reaction product of a polyol and a polyisocyanate. The components of the polyurethane prepolymer can be selected to moisture cure to a pressure sensitive adhesive, or can be formulated with other components to form a pressure sensitive adhesive when cured. The polyurethane prepolymer can be present in the moisture curable composition in an amount greater than about 25% by weight, preferably from about 35% by weight to about 90% by weight, more preferably from about 40% by weight to about 75% by weight, most preferably from about 40% by weight to about 60% by weight.

The polyol used to form the polyurethane prepolymer has a low level of unsaturation. Preferred polyols have a level of unsaturation that is less than 0.02 milliequivalents (meq)/gram (g), more preferably less than about 0.015 meq/g, even more preferably less than about 0.01 meq/g, most preferably 0.00 meq/g. Most commercially available low monol content polyols have an unsaturation level of from about 0.005 meq/g to about 0.02 meq/g.

Useful polyols include diols and triols and mixtures thereof. Preferred diols have a hydroxyl (—OH) functionality of from about 1.90 to about 2.00, more preferably from about 1.95 to about 1.99, most preferably from about 1.90 to about 1.99. Preferred triols have an —OH functionality of from about 2.85 to less than about 3.0, more preferably from about 2.90 to about 2.99.

Suitable polyols have a molecular weight greater than about 4,000, preferably eater than about 6000, more preferably from about 8,000 g/mole to about 20,000 mole. Particularly useful polyols have a molecular weight from about 8,000 g/mole about 12,000 g/mole.

Examples of useful polyols include polyether polyols including, e.g., polyethylene oxide polyols and polypropylene oxide polyols. Useful polyether polyols include relatively higher amounts of propylene oxide, e.g., from about 60 mole-% to about 100 mole-%, and ethylene oxide contents of less than about 40 mole-%, preferably less than about 20 mole-%, most preferably less than about 10 mole-%.

The prepolymer composition can also include relatively low molecular weight polyols, i.e., polyols having a molecular weight less than about 2,000 g/mole. Other polyols may be incorporated into the polyurethane compositions including, e.g., other polyether polyols (e.g., polytetrahydrofuran polyols, polyethylene oxide polyols, and polypropylene oxide polyols), polyester polyols, polybutane polyols, polyalkylene polyols (e.g., polybutadiene), and combinations thereof. These polyols may be incorporated in the composition in amounts of less than about 50% by weight, preferably from 0% by weight to about 30% by weight, most preferably from 0 wt-% to about 20 wt-% of the total polyol content.

The polyisocyanate preferably has at least 2.0 isocyanate groups but may have less than 2 isocyanate groups. The polyisocyanate and the polyol are selected to produce a reaction mixture having a NCO:OH ratio of from about 1.5 to about 4.0, preferably from about 1.5 to about 3.0, more preferably from about 2.0 to about 3.0. One of skill in the art would understand how to achieve the desired NCO:OH ratio. The % residual NCO present after the prepolymer is made but prior to cure is preferably less than about 1.5%, more preferably less than about 1.0%.

Suitable isocyanates can be di-, tri- or polyfunctional and can be aromatic isocyanates (including hydrogenated aromatic isocyanates), aliphatic isocyanates, and cycloaliphatic isocyanates. The isocyanate can also include mixtures of aromatic and aliphatic isocyanates and isocyanates that have both aliphatic and aromatic character.

Useful aliphatic polyisocyanates include, e.g., isophorone-diisocyanate, hexane diisocyanate, hydrogenated diphenylmethane-di-isocyanate, and mixtures thereof.

Useful aromatic isocyanates include diphenylmethane diisocyanate compounds (MDI) including its isomers, e.g., diphenylmethane-4,4-diisocyanate, diphenylmethane-2,4-diisocyanate, carbodjimide modified MDI, diphenylmethane-2,4'-diisocyanate, and other oligomeric diphenylmethane isocyanates; toluene diisocyanate compounds (TDI) toluene-diisocyanate, including isomers thereof; tetramethylxylene diisocyanate (TMXDI), isomers of naphthylene diisocyanate, isomers of triphenylmethane triisocyanate, and mixtures thereof.

Many useful isocyanates are described in U.S. Pat. No. 4,775,719 issued Oct. 4, 1988, U.S. Pat. No. 4,808,255 issued Feb. 28, 1989 and U.S. Pat. No. 4,820,368 issued Apr. 11 to Markevka et al., and incorporated herein. An example of a useful commercially available isocyanate is Isonate® 2125M pure diphenylmethane diisocyanate (MDI) manufactured by Dow Chemical Co. (Midland, Mich.).

The isocyanate can also include other substituents that do not substantially adversely affect the properties of the isocyanate including, e.g., the viscosity of the isocyanate terminated prepolymer, the adhesive properties of the bond line or the reactivity of the —NCO groups during the formation of the prepolymer.

To accelerate the curing reaction, catalysts may be added to the composition. Useful catalysts include, but are not limited to, those catalysts that include both ether and morpholine functional groups, e.g., with 2,2-dimorpholinoethyl ether and di(2,6-dimethyl morpholinoethyl)ether. A useful catalyst is 4,4'-(oxydi-2,1-ethanediyl) bis-morpholine, which known in the trade as DMDEE and is commercially available under the trade designation Jeffcat® DMDEE from Huntsman Corp. (Houston, Tex.).

Other useful catalysts include, e.g., organo tin catalysts, e.g., dibutyl tin dilaurate, and bismuth catalysts. Bismuth octoate is a very good moisture cure catalyst, but is not as stable as some catalysts during shipping and storage where the temperatures may reach about 65° C.

The catalyst is preferably present in the moisture curable composition in an amount of from about 0.05% by weight about 5% by weight, more preferably from about 0.1% by weight to about 2% by weight, most preferably from about 0.1% by weight to about 1% by weight.

The moisture curable composition can also include tackifying resins. Tackifying resins may be added to increase the tack and improve the pressure sensitive adhesive qualities of the cured composition. Tackifying resin can be added to the moisture curable composition to increase the peel adhesion of the composition to a variety of substrates including, e.g., stainless steel. Increasing the concentration of tackifying resin within the useful range, will generally correspond to increasing peel values. However, changing other ingredients at the same time will impact this result as well.

The tackifying resin is selected to be compatible with the composition. Preferably the resulting composition is free from phase separation or a gelatin like appearance. The tackifying resin is also preferably sufficiently compatible with the composition such that the composition is relatively clear, preferably translucent. However, compositions may be opaque and still be quite compatible. Those tackifiers having residual acid numbers such as rosin based tackifying resins and those resins having phenolic functionality should be selected with care as the residual acid may react in the moisture cure system. One of skill in adhesive art would recognize that there are numerous tackifying resins that may be utilized.

The tackifying resin can be a solid or a liquid. Suitable solid tackifying resins have ring and ball softening points of between about 70° C. and 150° C. Examples of useful tackifying resins include hydrocarbon-based tackifying resins, terpene-based tackifying resins, and rosin-based tackifying resins. These resins contain no functional groups that may react with the isocyanate of the moisture curable composition. Useful hydrocarbon-based tackifing resins include aliphatic, cycloaliphatic and aromatic hydrocarbon resins and modified versions and hydrogenated derivatives thereof. Useful terpene-based tackifying resins include terpenes, polyterpenes, and modified terpenes, hydrogenated derivatives thereof, and mixtures thereof.

Solid tackifying resins are also available with differing levels of hydrogenation, or saturation, another commonly used term. Examples of useful commercially available tackifying resins include Eastotac™ H-100, H-115, H-130 and H-142 partially hydrogenated cycloaliphatic petroleum hydrocarbon resins having different softening points (Eastman Chemical Co., Kingsport, Tenn.). The Eastotac™ tackifying resins are available in the E grade, the R grade, the L grade and the W grade, which have differing levels of hydrogenation from least hydrogenated (E) to most hydrogenated (W). Other useful tackifying resins include Escorez™ 5300 and Escorez™ 5400 partially hydrogenated cycloaliphatic petroleum hydrocarbon resins, and Escorez™ 5600 partially hydrogenated aromatic modified petroleum hydrocarbon resin all available from Exxon Chemical Co. (Houston, Tex.); Wingtack™ Extra aliphatic, aromatic petroleum hydrocarbon resin available from Goodyear Chemical Co. (Akron, Ohio); Hercolite™ 2100 a partially hydrogenated cycloaliphatic petroleum hydrocarbon resin available from Hercules (Wilmington, Del.); Zonatac™ 105 Lite a styrenated terpene resin made from d-limonene and available from Arizona Chemical Co. (Panama City, Fla.), Regalrez® 1094 aromatic hydrogenated hydrocarbon resin available from Hercules; phenolic modified terpene resins including Noirs® terpene phenolic resins from Hercules, and Dertophene® resins available from Sovereign Chemical Co. (Akron, Ohio) and phenolic modified copolymer of styrene and α-methyl styrene available under the tradename of Uratak™ from Arizona Chemical Co.

Other useful resins include rosin ester resins. Rosin ester resins are selected to have a sufficiently low residual acid number and OH number. The rosin resins may be based on gum rosins, wood rosins, tall-oil rosins, distilled rosins, dimerized rosins and polymerized rosins. Some specific examples include glycerol and pentaerythritol esters of wood rosins and tall-oil rosins and esters of hydroabietyl alcohols. Commercially available grades include, but are not limited to, Sylvatac™ 1103 pentaerythritol rosin ester available from Arizona Chemical Co., Unitac R-100 Lite pentaerythritol rosin ester from Union Camp (Wayne, N.J.), Permalyn™ 305, a erythritol modified wood rosin available from Hercules, Inc. (Wilmington, Del.) and Foral 105 highly hydrogenated pentaerythritol rosin ester available. These resins are useful provided that the residual acid number and the —OH numbers are low.

Particularly useful hydrocarbon tackifying resins are based on alphamethyl styrene. Useful alpha methyl styrene resins are commercially available under the trade designations Kristalex® 3070, 3085 and 3100 having softening points of 70° C., 85° C. and 100° C., respectively (Hercules, Inc.).

There are many types and grades of tackifying resins available from many companies. One skilled in the art would recognize that this is a representative rather than an exclusive list. The compatibility of these resins is dependent on the composition and molecular weight of the polyol. Tackifying resins can be present in the moisture curable composition in an amount of from 0% to about 75% by weight, preferably from 0% to about 60% by weight, most preferably from about 20% to about 60% by weight.

The moisture curable composition can also include a thermoplastic polymer to impart improved film-forming characteristics to the composition. The thermoplastic polymer is selected to be compatible with the moisture curable composition including, e.g., the polyol of the composition. Useful thermoplastic polymers include Pearlstick® thermoplastic polyurethane polymers from Aries Technologies in Derry, N.H., a distributor of Merquinsa (Barcelona, Spain); Hytrel® butylene/poly(alkylene ether)phthalates from DuPont de Nemours (Wilmington, Del.); polyvinyl methyl ether polymers available from BASF (Charlotte, N.C.); ethylene vinyl acetate copolymers also available from Du Pont de Nemours under the tradename of Elvax® and from Millennium Chemical Co., USI Division (Cincinnati, Ohio) under the tradename of Ultrathene®; ethylene n-butyl acrylate copolymers available from Quantum Chemical Co., USI Division (Cincinnati, Ohio) under the tradename of Enathene®, from Exxon Chemical Co. (Houston, Tex.) under the tradename of Escorene® and from Elf Atochem North America (Philadelphia, Pa.) under the tradename of Lotryl®; ethylene methyl acrylate available from Exxon under the tradename of Optema®; ethylene acrylate copolymers from Du Pont under the tradename of Elvaloy®; ethylene n-butyl acrylate carbon monoxide terpolymers available from Du Pont also under the tradename of Elvaloy® and acrylic polymers such as those supplied by ICI Acrylics (St. Louis, Mo.) under the tradename of Elvacite® from Schenectady. The thermoplastic polymer can be present in the composition in an amount of from 0% to about 60% by weight, preferably no greater than about 50 wt-%, most preferably no greater than about 30% by weight of the moisture curable composition.

The moisture curable composition can also include a plasticizer. The plasticizer can be added to alter a variety of properties of the cured and uncured composition including such properties as, e.g., extrudability, flexibility, workability and stretchability, or a combination thereof. Preferred plasticizers are compatible with the cured adhesive composition, and exhibit low volatility at temperatures greater than about 85° C. The plasticizer is selected such that it does not react with components of the moisture curable composition.

Useful plasticizers are organic and include mineral based oils and petroleum based oils, liquid resins, liquid elastomers, polybutene, polyisobutylene, phthalate and benzoate plasticizers and epoxidized soya oil. Suitable plasticizers also include oils, e.g., hydrocarbon oils, that are low in aromatic content and paraffinic or naphthenic in character. The oils are preferably low in volatility, transparent and have as little color and odor as possible. Plasticizers such as olefin oligomers, low molecular weight polymers, vegetable oils and their derivatives and similar plasticizing oils can also be used. Plasticizers or oils having —OH functionality or —COOH flunctionality will react with the components of the moisture cure system causing undesirable results.

Examples of other useful plasticizers include Calsol™ 5120 naphthenic petroleum based oil available from Calumet Lubricants Co. (Indianapolis, Ind.); Kaydol™ White Mineral Oil paraffinic mineral oil available from Witco Corp. (New York, N.Y.); Parapol™ 1300 liquid butene homopolymer available from Exxon Chemical Co. (Houston, Tex.); Indopol H-300 liquid butene homopolymer available from Amoco Corp. (Chicago, Ill.); Escorez 2520 liquid aromatic petroleum based hydrocarbon resin with a pour point of 20° C., available from Exxon Chemical Co.; and Regalrez 1018, a liquid hydrogenated hydrocarbon resin with a pour point of 18° C., available from Hercules, Inc. (Chicago); and Piccolastic™ A-5 liquid aromatic tackifying resin available from Hercules. One skilled in the art would recognize that any generic 500 second or 1200 second naphthenic process oil would also be useful.

Solid plasticizers may also be useful to the present invention. Examples of such plasticizers include Benzoflex™ 352 1,4-cyclohexane dimethanol dibenzoate, Benzoflex™ S-404 glyceryl tribenzoate and Benzoflex™ S-552 pentaerythritol tetrabenzoate all available from Velsicol Chemical Corp. (Rosemont, Ill.). Another example of a useful solid plasticizer is dicylcohexylphthalate.

When the moisture curable composition is formulated to be applied as a hot melt, the composition may also include a relatively small amount of wax. Chlorez™ 700 DD chlorinated paraffin wax from Dover Chemical Corp. (Dover, Ohio) is an example of a useful wax. Preferably the wax is added in relatively small amounts so as to maintain the pressure sensitivity and tack of the cured composition.

The moisture curable composition may optionally contain other components such as adhesion promoters including silane based adhesion promoters. Preferred silanes have high boiling points, preferably greater than about 120° C. An example of a useful silane compound is Silquest™ Y11597 from OSI Specialties Inc. (Dover, Ohio). Silane adhesion promoters are useful from about 0.01% to about 5% by weight, preferably from about 0.01% to about 2% by weight, more preferably from about 0.01% to about 1% by weight of the composition. Adhesion promoters may be added either during the preparation of the polyurethane prepolymer as a reactant, or during the addition of thermoplastic components, when added, where the reaction of the adhesion promoter with other ingredients would be more limited.

Fluorocarbons may also be optionally added.

Stabilizers or antioxidants may be added to protect the composition from degradation caused by reaction with oxygen induced by such things as heat, light or residual catalyst from the raw materials such as the tackifying resin. Such antioxidants are commercially available from Ciba-Geigy (Hawthorne, N.Y.) and include Irganox™ 565, Irganox™ 1010 and Irganox™ 1076, all hindered phenolic antioxidants. These are primary antioxidants that act as free radical scavengers and may be used alone or in combination with other antioxidants such as phosphite antioxidants like Irgafos™ 168 available from Ciba-Geigy. Phosphite antioxidants are considered secondary antioxidants, are primarily used as peroxide decomposers and are generally not used alone, but are instead used in combination with other antioxidants. Other available antioxidants include Cyanox™ LTDP thioether antioxidant available from Cytec Industries (Stamford, Conn.), Ethanox™ 330 hindered phenolic antioxidant available from Albemarle (Baton Rouge, La.). Many other antioxidants are available for use by themselves, or in combination with other antioxidants. These compounds are added to hot melt compositions in relatively small amounts, preferably no greater than about 2% by weight.

The composition may also include other components including, e.g., pigments which add color, fluorescing agents, weatherability improvers, e.g., ultraviolet (UV) absorbers like Tinuvin™ P, 327 and 328 from Ciba-Geigy and UV scavengers such as Tinuvin™ 770 from Ciba-Geigy, and odor masks. Additives such as these are known to one of skill in the art. The other components are added in amounts such that the desired properties of the composition are maintained.

The composition may also include a filler, including talcs, clays, silicas and treated versions thereof, carbon blacks and micas. Examples of such fillers include Mistron Vapor™ talc from Luzenac America, Inc. (Englewood, Colo.); Nytal™ 200, 300 and 400, different particle size grades of talc from R.T. Vanderbilt Co. (Norwalk, Conn.); Snobrite™ Clay, a Kaolin clay available from Evans Clay Co. (Mcintyre, Ga.); Cab-o-sil™ TS-720 fumed silica available from Cabot Corp. (Tuscol, Ill.) and Mineralite™ 3x and 4xmicas, high compression strength glass beads and spheres, available from Mineral Mining Corp. (Kershaw, S.C.).

Calcium carbonates are also suitable provided they are first dried and the pH compensated for to prevent the filler from leaching into the thermoplastic moisture cure polyurethane composition and catalyzing unintended reactions.

The polyurethane prepolymer and other components of the pressure sensitive adhesive composition can be selected to achieve a pressure sensitive adhesive exhibiting predetermined properties such that the composition is suitable for an intended application. For example, the composition can be formulated to exhibit a desired temperature resistant as determined, e.g., by shear adhesion failure test (SAFT), 180° peel adhesion, solvent resistance, or a combination thereof. The composition may be formulated such that, when cured, it exhibits SAFT values in excess of 90° C. The composition may also be designed so as to exhibit SAFT values in excess of 120° C. depending on the application. Some high quality tape applications require higher SAFT values while other applications, such as for skin attachment, may not. The pressure sensitive adhesive compositions can also be formulated to exhibit extremely high SAFT values, peel values and superior bonding performance, which render them particular useful as high performance adhesives, which are utilized in a variety of industries including, e.g., the structural, automotive, appliance, HVAC, window, and woodworking industries. A variety of other pressure sensitive adhesive applications are discussed in more detail below.

The moisture curable composition can be prepared by combining the components of the composition, and then heating the composition to form the polyurethane prepolymer.

The polyurethane prepolymer phase is typically prepared by reacting the polyol or polyols with at least one polyfunctional isocyanate compound at an elevated temperature of typically between about 40° C. and about 120° C., and more preferably between about 60° C. and about 90° C. The polyols may first be introduced into a reaction vessel, heated to reaction temperatures and dried to remove ambient moisture absorbed by the polyols. The polyfunctional isocyanate is then added to the reactor. The polyols are generally reacted with the isocyanate compounds at ratios that typically depend on the hydroxy and isocyanate functionality of the reactants. Typically the compounds are reacted at ratios that result in a reaction between isocyanate groups and hydroxy groups leaving essentially no residual hydroxy and minimal isocyanate functionality. The reaction between the polyol compounds and the isocyanate compounds is conducted at an NCO:OH ratio of from about 1.5:1.0 to about 4.0:1.0 in order to obtain an NCO concentration in the final composition, prior to cure, of from about 0.1% by weight to about 3.0% by weight, preferably less than about 1.5% by weight, more preferably less than about 1.0% by weight. Typically, the prepolymer is titrated to measure residual concentration of isocyanate using ASTM D-2572-80 "Standard Method for Isocyanate Group and Urethane Materials or Prepolymers" to determine completion of the reaction. If the NCO:OH ratio is higher, the storage modulus, G', increases and the prepolymer may become too stiff as a result making the composition either less pressure sensitive or even non-pressure sensitive. In other words, the tack and pressure sensitivity may decrease resulting in a composition that is not suitable as a pressure sensitive adhesive or coating.

The moisture curable composition is cured to form a pressure sensitive adhesive composition by contacting the composition with moisture, e.g., atmospheric or ambient moisture. During the curing process, available isocyanate groups react with water to form a pressure sensitive adhesive composition that includes polyurethane-urea polymer. A variety of methods can be used to contact the composition with moisture including, e.g., exposing the composition to ambient moisture, contacting the composition with moisture in the form of a spray, mist, fog or a combination thereof, placing the composition in a chamber with high humidity (i.e., greater than about 75% relative humidity), and combinations thereof. One example of useful curing processes includes coating the moisture curable composition onto a substrate, e.g., a backing or a release liner, and then contacting the exposed composition with moisture. The curing process can further include applying a second substrate to the moisture contacted surface of the composition to maintain (e.g., trap) the moisture in contact with the composition, which can facilitate the curing process.

While the choice of component, order of addition, and addition rate can be left to the skilled adhesives chemist, generally the thermoplastic polymer containing compositions can be made by preparing the isocyanate capped prepolymer and then blending the prepolymer with the thermoplastic polymer, other components of the adhesive composition, and any other optional ingredient that may be added, or by adding the thermoplastic polymer to the prepolymer mixture during the preparation stage of the prepolymer.

The polyurethane prepolymer composition can be packaged in suitable moisture proof containers, immediately blended with other optional components to form a moisture curable composition, which also may be packaged in suitable moisture proof containers, or coated on a substrate and cured to form a pressure sensitive adhesive article.

The moisture curable composition can be applied to a substrate using any coating method available including, e.g., roll coating, slot die coating, and gravure coating. The composition may also be applied using a variety of methods including, e.g., methods that use extrusion equipment such as that manufactured by Nordson corp. (Atlanta, Ga.), spraying techniques, fiberization techniques (e.g., spiral spraying and melt blown techniques), and screen printing (e.g., pattern coating). Fiberization techniques often include impinging pressurized air on a stream of composition as it exits from an orifice to alter the path of the stream of composition. When formulated to be a thermoplastic, the composition can be heated (e.g., to melt or liquefy the composition) to ease application of the composition, and then applied in the form of a melt, e.g., a hot melt pressure or a warm melt. The composition can be coated on a substrate in a continuous or discontinuous coating, in a pattern, randomly, or a combination thereof.

The pressure sensitive adhesives can be formulated to exhibit varied properties suitable to a variety of applications. Pressure sensitive adhesives are characterized by a series of different grades including permanent grade, semi-permanent grade, freezer grade, and removable grade pressure sensitive adhesives, each of which are useful in a variety of applications. Permanent grade adhesives are utilized where it is desired to permanently adhere one substrate to another. These adhesives typically have relatively high peel adhesion values and are utilized for applications such as mailing labels, bottle labels, case seal tape, tamper evident bag closures and so forth. The compositions of the present invention have been found to achieve 180° peels to stainless steel of as high as about 12 pounds per lineal inch (pli) (about 3,500 N/m) at a coat weight of about 1.0 to about 1.5 mils (about 25 to about 40 g/m2). Permanent grade PSA's are typically characterized by 180° peels to stainless steel of greater than about 4 pli (about 700 N/m), preferably greater than about 4.5 pli (about 790 N/m), most preferably greater than about 5 pli (about 875 N/m). The cured pressure sensitive adhesive compositions have been found to have particular utility for permanent grade pressure sensitive applications.

Another area where the permanent grade pressure sensitive adhesives may be utilized is for precoated stock used in the automotive area such as for appliques, emblems, decorative vinyl application and body side molding applications. Plasticizer resistance is needed where vinyl is used.

The compositions of the present invention may also used for high quality tapes such as double faced tape (splicing or transfer tape). These tapes require high peel pressure sensitive adhesives. Double faced tapes are utilized in the automotive area and in the computer area (i.e., disc drives). The pressure sensitive polyurethane adhesive may be coated onto either side of a high elongation strip or foam strip which is made of polyurethane for instance making the double sided PSA tape. However, these compositions may be foamed themselves to make a double face foam tape. In this instance, the PUR would act as both the foam substrate and as the adhesive reducing the need for two components, tape and adhesive, to only one. These compositions may also be used for wide web foam tapes which are also referred to in the industry as "sticky backs."

Semi-permanent grade or repositionable adhesives allow a substrate to be removed for a short period of time after application. These adhesives typically have peel values below 4 pli (about 700 N/m). These adhesives are designed so that adhesion builds over time until the bond is permanent. These adhesives have good adhesion at refrigeration temperatures. These grades are used for food label applications, i.e., dairy products, for instance.

Freezer grade adhesives are designed to have good adhesion to substrates to temperatures as low as about −30° C. These adhesives are used for frozen food labels and freezer shelf identification.

The composition can also be formulated to provide a removable grade pressure sensitive adhesive, which is an adhesive designed to allow removability of one substrate from another at any time after application. Removable grade pressure sensitive adhesives do not build significantly in peel adhesion over time, i.e., the peel adhesion value does not increase significantly upon aging of the adhesive bond. These adhesives are characterized by relatively low 180° peel adhesion values to stainless steel, preferably less than about 3.0 pli (about 17 N/m), more preferably less than about 2.0 pli (about 350 N/m), most preferably less than about 1.5 pli (about 265 N/m). Typical applications include magazine tipping, credit card attachment, removable store shelf marking for sale items, labels for electronics and appliances and so forth.

Removable grade pressure sensitive adhesive compositions have been found to have particular utility in the medical applications area such as for skin attachment adhesives. These applications include EKG pads, wound dressings, and bandages. Removable grade compositions are also used in the medical area for ostomy applications, as hydrocolloid pressure sensitive adhesives and for sterilizable medical packaging.

Pressure sensitive adhesive compositions may also be utilized in the nonwoven area including, e.g., diaper tapes, and hook and loop attachments, and for positioning of hygiene articles such as for feminine hygiene.

Pressure sensitive adhesive compositions may also be utilized in the furniture area for fabric and vinyl attachment, flexible lamination and for profile wrapping. The pressure sensitive adhesive compositions can be formulated to have superior plasticizer, solvent and other chemical resistance.

Pressure sensitive adhesive compositions may also be utilized in the graphic arts area such as for casing-in, in packaging (e.g., packaging tapes), in tamper evident applications, and for express type mailing envelopes such as those manufactured of high density spun polyolefin often sold under the trade designation Tyvec. The compositions can be formulated to prevent the opening of an envelope by softening the adhesive through steaming.

The pressure sensitive composition can also be formulated to be breathable, i.e., allowing moisture to pass through the composition. Breathable pressure sensitive adhesive compositions find utility in a variety of applications on a variety of substrates including, e.g., breathable fabrics, breathable seam seals, shoe sock linings, and fabrics and foams for shoes. Breathable pressure sensitive adhesives may also be used for adhering to and for coating woven and nonwoven materials for use in the medical industry including, e.g., garments, face masks, and bandages, athletic gear, rain protective garments, tarpaulins, waterproof garments and articles, and where breathability is desired. Examples of fabrics that can be made waterproof or that are waterproof include polytetrafluoroethylene, microporous polypropylene, woven and tightly spaced nonwoven polyethylene and propylene. Gortex™ is trademark fabric utilized for waterproof, yet breathable, athletic and rain gear. Often, waterproof materials have been treated with a hydrophobic agent. Hydrophobic means that water will not spread on the material and wick into its porous structure. Water vapor, on the other hand, which may evaporate or desorb from the hydrophilic layer, is free to flow or diffuse as a gas through the pores of the hydrophobic layer to the exterior environment. These flexible materials may further be laminated to other flexible layers including knitted or random laid materials such as fleeces. Examples of such materials include nylon, polyester and nylon tricot knit for instance.

Breathable pressure sensitive adhesive compositions may also be utilized on rigid substrates including those materials used in manufacturing shoes, as well as for applications in the building industry.

The compositions may also be used in solvent based adhesive applications such as for contact cements. Other applications include transfer tapes, masking tapes, film labels and so forth. These pressures sensitive adhesive compositions may be utilized in a variety of other applications not mentioned herein where pressure sensitive adhesives are currently used.

The invention will now be described by way of the following non-limiting examples.

EXAMPLES

Test Procedures

Test procedures used in the examples include the following.

Shear Adhesion Failure Temperature (SAFT)

SAFT values in ° C. are determined as follows. The adhesive composition is coated at a temperature of about 80° C. onto Mylar® polyester film (Du Pont de Nemours, Wilmington, Del.) at a coat weight of about 25 g/m² (1 mil) to provide a coating thickness of about 25.4 microns (1 mil). (The samples may also be solvent coated but this is less desirable.) The samples are allowed to cure for at least 3 days (usually 3–7 days) at ambient temperature. The sample is cut into 1 inch×3 inch (2.54 cm×7.62 cm) strips and two coated strips are laminated together overlapping a 1 inch×1 inch (2.54×2.54 cm) area being careful not to entrap air bubbles. One end of the laminate is affixed to the ceiling of a programmable forced air oven with a clamp. A 500 gram weight is then suspended from the other end of the laminate. The oven temperature is ramped at a rate of 25° C. per hour to 175° C. The temperature at which the specimen fails is recorded. This measurement is used as an indication of the heat resistance of the composition. Heat resistance is desirable for compositions that are shipped.

180° Peel Adhesion to Stainless Steel

Peel adhesion was determined using test method #PSTC-1 (Pressure Sensitive Tape Council Test Method 1).

Molten (about 80° C.) adhesive is coated at a film thickness of from about 1.0 mil to about 1.5 mil (about 25.0 g/m² to about 37.5 g/m²) onto Mylar® polyester film. Samples were allowed to cure for approximately 3 days at ambient (room) temperature. Samples were then cut into 1 in×8 in strips (2.54 cm×20.32 cm) for determining peel values.

Loop Tack Quick Tack or Quick Stick

Molten adhesive (about 80° C.) is coated onto Mylar® polyester film to a film thickness of from about 1.0 mil to about 1.5 mil (about 37.5 g/m²) when cool. The film is allowed to cure for about 3 days. The film is then mated with a release liner and cut into 1 in×5 in strips (2.54 cm×12.7 cm). A 1 in ×5 in test sample is then inserted into a Cheminstruments Loop Tack Tester Model LT-105 (Fairfield, Ohio) with the adhesive side facing out (release liner removed). The Loop Tack Tester automatically records the tack value in oz/in².

Example 1A

To a reaction vessel were added 157.9 g of Kristalex 3085, α-methyl styrene resin with a softening point of about 85° C. and 150 g of Acclaim® Polyol 12200 difunctional polyether polyol having a molecular weight of about 12,000 g/mole and an unsaturation of about 0.005 meq/g. The composition was then heated to 110° C. and placed under vacuum. After about 5–10 minutes, the temperature was raised to 120° C. and held for about 1 hour to drive off water. The temperature was dropped to 70° C., 7.91 g of Isonate 2125 MDI (diphenylmethane4,4-diisocyanate) (Dow) was added, and the temperature was then increased to about 80° C. After about 5 minutes, a small amount, ~0.07g, of T-12 dibutyl tin dilaurate catalyst, was added and the reaction was allowed to continue for about 2 hours at a temperature of about 80° C. The resultant composition was 50:50 weight ratio of prepolymer to hydrocarbon resin. The resultant prepolymer had 0.5% residual NCO concentration.

The composition was subjected to the SAFT, 180° Peel Adhesion, and Loop Tack test methods. The composition exhibited 180° peel adhesion to stainless steel in excess of 14 pli (in excess of 2450 N/m), loop tack values of greater than about 150 oz. (4.25 kg), and SAFT values in excess of 250° F. (121° C.). The results are summarized in Table II. This composition is useful as a permanent grade pressure sensitive composition.

Example 1B

Example 1A was repeated using the same procedure with the exception that 750.0 g Acclaim® Polyol 12200, 789.5 g Kristalex® 3085 α-methyl styrene resin and 39.6 g of Isonate 2125 MDI were used.

The composition was subjected to the SAFT, 180° Peel Adhesion, and Loop Tack test methods. The composition had 0.43% residual NCO and exhibited SAFT values of greater than about 256° F. (about 125° C.), loop tack values of greater than about 4.5 kg, 180° peel adhesion to stainless steel of about 19.5 pli (about 3415 N/m) average and peak values of about 23.5 pli (4115 N/m). The results are also summarized in Table II. This composition is useful for permanent bonding.

The composition of Example 1B was then applied to a plasticized polymeric film using J & M Meltblown application equipment and premelter, and then bonded to nonwoven material using a web handling wind/rewind coater manufactured by May Coating Technologies, Inc. in St. Paul, Minn. Two different coat weights were tested and the following results were obtained.

TABLE I

| Coatweight | 15 mg/in² (2.3 mg/cm²) | 30 mg/in² (4.7 mg/cm²) |
| --- | --- | --- |
| Initial Peak Peel (PP) | 351 g | 735 g |
| Initial Average Peel | 295 g | 650 g |
| 1 Week Aged PP | 345 g | 665 g |
| 1 Week Aged Ave Peel | 285 g | 595 g |
| Initial Shear | 60 minutes | 1540 minutes |
| 1 Week Aged Shear | 85 minutes | 725 minutes |

Example 2

The composition of Example 2 was prepared according to the procedure of Example 1A except that 140.5 g Acclaim® Polyol 8200, a difunctional polyether polyol having a molecular weight of 8,000 g/mole and an unsaturation of 0.005 meq/g; 149.1 g Kristalex® 3085 hydrocarbon resin, and 8.63 g Isonate 2125 MDI were used in this instance. The resultant polyurethane composition had 0.40% residual NCO.

The composition of Example 2 was subjected to the SAFT, 180° Peel Adhesion, and Loop Tack test methods. The composition exhibited SAFT values of greater than about 256° F. (about 125° C.), loop tack values of greater than about 4.5 kg, 180° peel adhesion to stainless steel of about 16.5 pli (about 2890 N/m) average and peak value of about 3850 N/m. The results are summarized in Table II. This composition is useful as a permanent grade pressure sensitive adhesive.

Example 3

To a reaction vessel was added 146.3 g Arcol® R-2623 polyol and 150.0 g Kristalex 3085 hydrocarbon resin. This mixture was placed under vacuum at 23° C. into the reaction vessel, which was then heated to a temperature of about 110° C. after about 10 minutes. The temperature set point was raised to 120° C. and kept there for about 1 hour under vacuum to drive off the water. The temperature was then lowered to about 80° C. and about 3.81 g Isonate 2125 MDI was added to the reaction vessel. This mixture was then allowed to react for about 2 hours yielding a polyurethane prepolymer with about a 0.15% residual NCO content.

The composition of Example 3 was subjected to the SAFT, 180° Peel Adhesion, and Loop Tack test methods. The composition exhibited SAFT values of greater than about 256° F. (about 125° C.), loop tack values of greater than about 158 oz (4.5 kg), and 180° peel adhesion of about 875 N/m (about 5 pli) and peak peel values of about 1225 N/m (about 7 pli). The results are also summarized in Table II. This composition would be useful as a permanent pressure sensitive adhesive.

Example 4

The same procedure was followed as for Example 3 with the exception that 1068.8 g of Acclaim® Polyol 12200 polyether polyol, 374.5 g Kristalex® 3085 hydrocarbon resin and 56.6 g MDI were utilized. The resultant composition had 0.68% residual NCO, The composition was subjected to the SAFT, 180° Peel Adhesion, and Loop Tack test methods. SAFT values of greater than about 256° F. (125° C.), loop tack values of about 1.7 Kg (60 oz) and 180° peel adhesion values of about 525 N/m (3.0 lbs). The results are also summarized in Table II. This composition is useful as a removable grade pressure sensitive adhesive and for skin attachment applications.

TABLE II

| Example | Polyol | Degree of Unsaturation | Isocyanate | Tackifier | 180° Peel Adhesion (SS) (N/m) | Loop Tack (Kg) | SAFT ° C. |
|---|---|---|---|---|---|---|---|
| 1A | 150 | 0.005 | 7.9 | 157.9 | >2450 | >4.25 | >121 |
| 1B | 750 | 0.005 | 39.6 | 789 | 3415 | >4.5 | >125 |
| 2 | 140.5 | 0.005 | 8.63 | 149.1 | 2890 | >4.5 | >125 |
| 3 | 146.3 | 0.005 | 3.81 | 150 | 875 | >4.5 | >125 |
| 4 | 1068.8 | 0.005 | 56.6 | 374.5 | 525 | 1.7 | >125 |

Other embodiments are within the claims.

What is claimed is:

1. A moisture curable composition comprising a polyurethane prepolymer comprising the reaction product of
   a) a polyol having an unsaturation of less than 0.02 meq/g; and
   b) a polyfunctional isocyanate,
said composition forming a pressure sensitive adhesive when cured.

2. The composition of claim 1, wherein said polyol is a polyether polyol.

3. The composition of claim 1, wherein said polyol has an unsaturation of less than 0.01 meq/g.

4. The composition of claim 1 wherein said polyol comprises less than about 40 mole % ethylene oxide.

5. The composition of claim 1, wherein said polyol comprises less than about 20 mole % ethylene oxide.

6. The composition of claim 1 wherein said polyurethane prepolymer has an NCO:OH ratio from about 1.5 to about 4.0.

7. The composition of claim 1 wherein said polyurethane prepolymer has an NCO:OH ratio from about 2.0 to about 3.0.

8. The composition of claim 1 wherein said polyol has a molecular weight of greater than about 4,000 g/mole.

9. The composition of claim 1 wherein said polyol has a molecular weight of at least about 8,000 g/mole.

10. The composition of claim 1 wherein said polyol is selected from the group consisting of diols having an —OH functionality from about 1.9 to 1.99, triols having a functionality from about 2.85 to about 2.99, and mixtures thereof.

11. The composition of claim 1 further comprising a tackifying resin.

12. The composition of claim 11 wherein said tackifying resin is a hydrocarbon tackifying resin.

13. The composition of claim 11 wherein said tackifying resin is an α-methyl styrene resin.

14. A moisture curable composition comprising a polyurethane prepolymer comprising the reaction product of
   a) a polyol having a molecular weight of at least about 6,000; and
   b) a polyfunctional isocyanate,
said composition forming a pressure sensitive adhesive when cured.

15. The moisture curable composition of claim 14, wherein said polyol has a molecular weight of at least about 8,000.

16. The moisture curable composition of claim 14, wherein said polyol has a molecular weight of at least about 12,000.

17. The moisture curable composition of claim 14, wherein said polyol has a molecular weight of from about 8,000 to about 20,000.

18. The composition of claim 14 wherein said polyurethane prepolymer has an NCO:OH ratio from about 1.5 to about 4.0.

19. An article comprising:
   a) a substrate; and
   b) the composition of claim 1 coated on a surface of said substrate.

20. A pressure sensitive adhesive composition comprising the moisture curable composition of claim 1.

21. A pressure sensitive adhesive comprising the reaction product of
   a) moisture, and
   b) a polyurethane prepolymer comprising the reaction product of
      i) a polyol having an unsaturation of less than 0.02 meq/g; and
      ii) a polyfunctional isocyanate.

* * * * *